United States Patent [19]
Bianchi et al.

[11] Patent Number: 5,744,795
[45] Date of Patent: Apr. 28, 1998

[54] ILLUMINATION STROBING IN A SCANNER TO IMPROVE IMAGE SHARPNESS AND POWER CONSUMPTION

[75] Inventors: Mark J. Bianchi; Richard L. Kochis, both of Fort Collins; Ronald K. Kerschner, Loveland; Dan L. Dalton, Greeley, all of Colo.

[73] Assignee: Hewlett-Packard Company, Palo Alto, Calif.

[21] Appl. No.: 509,468

[22] Filed: Jul. 31, 1995

[51] Int. Cl.⁶ .................. G06K 7/10; H04N 1/04
[52] U.S. Cl. .................. 250/234; 358/473; 358/475
[58] Field of Search .................. 250/234, 235, 250/208.1, 566, 568; 358/473, 471, 474, 475, 497; 235/462, 472

[56] References Cited

U.S. PATENT DOCUMENTS

| | | | |
|---|---|---|---|
| 3,770,940 | 11/1973 | Harr | 235/462 |
| 4,703,186 | 10/1987 | Nakayama et al. | 250/566 |
| 4,866,276 | 9/1989 | Leavens et al. | 250/341.6 |
| 5,306,908 | 4/1994 | McConica et al. | 250/234 |
| 5,381,020 | 1/1995 | Kochis et al. | 250/566 |

*Primary Examiner*—Edward P. Westin
*Assistant Examiner*—John R. Lee
*Attorney, Agent, or Firm*—Cynthia S. Baan

[57] ABSTRACT

An optical scanner that employs a pulsed light source that is synchronized to the scan position by a position encoder and a pulse control system. Such a scanner has an improved image sharpness and improved image registration. Moreover, a pulsed light source in a scanner of the present invention is more efficient and uses less power, which results in various cost and power savings. Such a scanner is capable of operating off a smaller power source (battery) and is capable of running for longer periods of time off a battery than scanners with a light source that is on during the entire scanning process.

9 Claims, 3 Drawing Sheets

ILLUMINATION STROBING IN A SCANNER TO IMPROVE IMAGE SHARPNESS AND POWER CONSUMPTION

FIELD OF THE INVENTION

The present invention relates generally to optical scanners and, more particularly, to battery-powered, hand-held optical scanners in which the light source is strobed to improve the image sharpness and to conserve battery power.

BACKGROUND OF THE INVENTION

Optical scanners are used to produce machine readable data which is representative of a scanned object, e.g. a page of printed text. Optical scanners employ line-focus systems to image scanned objects. In a line-focus system, a light beam from an illumination line object is imaged by a lens on a linear photosensor array which is positioned remotely from the line object. In an optical scanning device, the illuminated line object of the line-focus system is commonly referred to as a "scan line". The linear photosensor array is a single dimension array of photoelements which correspond to small area locations along the line object. These small area locations on the line object are generally referred to as "picture elements" or "pixels". In response to light from its corresponding pixel location on the line object, each photoelement produces a data signal which is representative of the intensity of light which is impinged upon it. All of the photoelement data signals are received and processed by an appropriate data processing system which may subsequently store the data on a suitable medium or generate a display signal therefrom for reproducing an image of the object with a display device such as a CRT or a printer. hand-held optical scanner is an optical scanner which is moved across a scanned object, e.g. a page of text, by hand. Most hand-held scanners have to date been powered by an external power source such as a power unit connected to a wall outlet and in turn connected to the hand-held scanner by an electrical cable. Such external power sources have been deemed necessary due to the significant electrical energy required to operate the various scanner components. For example, the optical imaging assembly of a scanner typically comprises an illumination source such as a fluorescent bulb. Other scanner subassemblies that require energy include the scanner photoelectric conversion assembly (typically a CCD) requires electrical energy as do the scanner speed detection circuitry and the scanner central processing unit. In the hand-held scanner of the preferred embodiment of the present invention, an onboard memory device is employed which also requires electrical energy to operate.

It would be generally desirable to provide a hand-held scanner with an onboard power source to eliminate the need for an external power connection or other connecting cables which "tether" the scanner to a fixed location. Such an arrangement would significantly improve the mobility and potential use applications for a hand-held scanner. However, the significant obstacle which must be overcome is the relatively short period of operation resulting from the use of an onboard power supply.

The current practice used in scanning involves a constant light source that is swept across the document being scanned. At the same time, a photoelectric conversion assembly which employs charge coupled device (CCD) type photosensors, is exposed to the illuminated document through reduction optics. All of the photoelements in a CCD linear array have the same fixed operating (sampling) interval, e.g., one millisecond. A data signal is produced by each element at the end of an operating interval and is representative of an average of the light intensity which the element experiences during the operating interval. Due to the averaging of the light intensity and also due to the fact that the scanner is in motion relative to the document during the operating interval, the reproduced image from the document will appear smeared. This problem can be exaggerated with a hand-held scanner, if the operator is constantly changing the rate at which the scanner is being moved across the document. It would be desirable to provide a scanner, especially a hand-held scanner, with a sharper image than the traditional smeared image that scanners today produce.

It would be a further advantage to provide a scanner, especially a hand-held scanner, with improved image registration by synchronizing the illumination to an exact scan position on the document. Image registration is especially pertinent in a hand-held scanner in the stop-start mode where the scanning motion is interrupted and image degradation may result by not returning to the exact position where the scanning was interrupted.

Hand-held optical scanners and the various components and systems thereof are disclosed in U.S. Pat. No. 5,381,020 for HAND-HELD OPTICAL SCANNER WITH ONBOARD BATTERY RECHARGING ASSEMBLY of Richard L. Kochis and Eric F. Aas; and U.S. Pat. No. 5,306,908 for MANUALLY OPERATED HAND-HELD OPTICAL SCANNER WITH TACTILE SPEED CONTROL ASSEMBLY of Charles H. McConica, Eric F. Aas, Richard L. Kochis, Dan L. Dalton, and Eugene A. Miksch, which are each hereby incorporated by reference for all that is disclosed therein.

SUMMARY OF THE INVENTION

The present invention is directed to a hand-held optical scanner which employs a pulsed light source that is synchronized to the scan position by a position encoder and a pulse control system. A scanner according to the present invention will have improved image sharpness and image registration. Moreover, a pulsed light source in a scanner of the present invention will be more efficient and use less power, which will result in various cost and power savings. Such a scanner will be capable of operating off of a smaller power source (battery) and will be capable of running for longer periods of time.

DESCRIPTION OF THE DRAWINGS

Illustrative and presently preferred embodiments of the invention are shown in the accompanying drawings in which.

DESCRIPTION OF THE INVENTION

Figure 1:
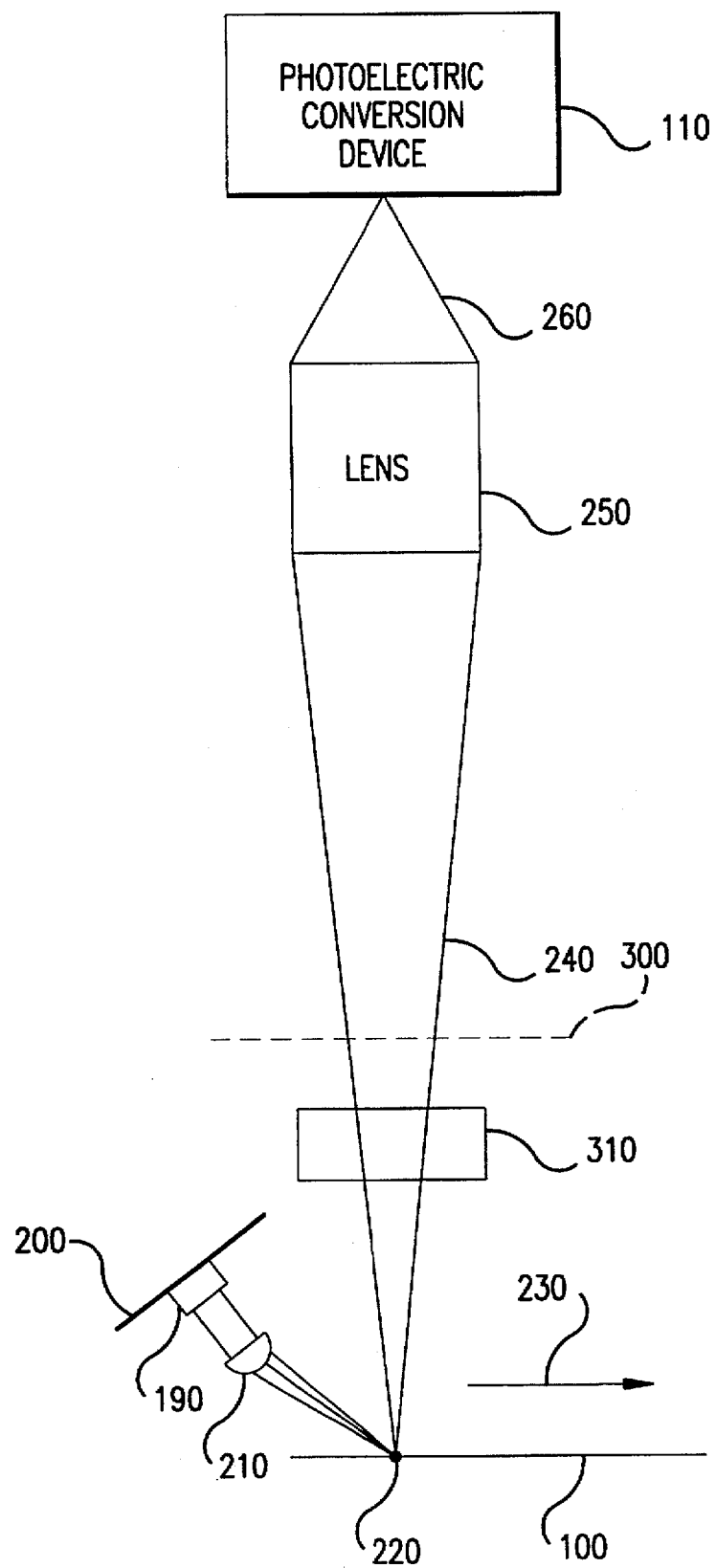
FIG. 1 is a basic block diagram showing the basic light elements of a scanner according to the present invention.

FIG. 1 shows a basic block diagram of the light elements of a scanner according to the present invention. Specifically, there is a light source 190 which is attached to a printed circuit board 200 and shines light through a lens 210 and onto a scan line 220 on document 100. The light source 190 is preferably a row of LEDs. As the light from light source 190 is reflected off of the document 100, it travels along path 240 to lens 250 which focuses the light 260 onto a photoelectric conversion device. The photoelectric conversion device is preferably a charge coupled device (CCD) type photosensor. As the scanner moves forward across the document 100, the light source 190 is strobed in a synchronized manner with the position of the scanner relative to the document 100 and in a synchronized manner relative to the sampling rate of the CCD.

Figure 2:
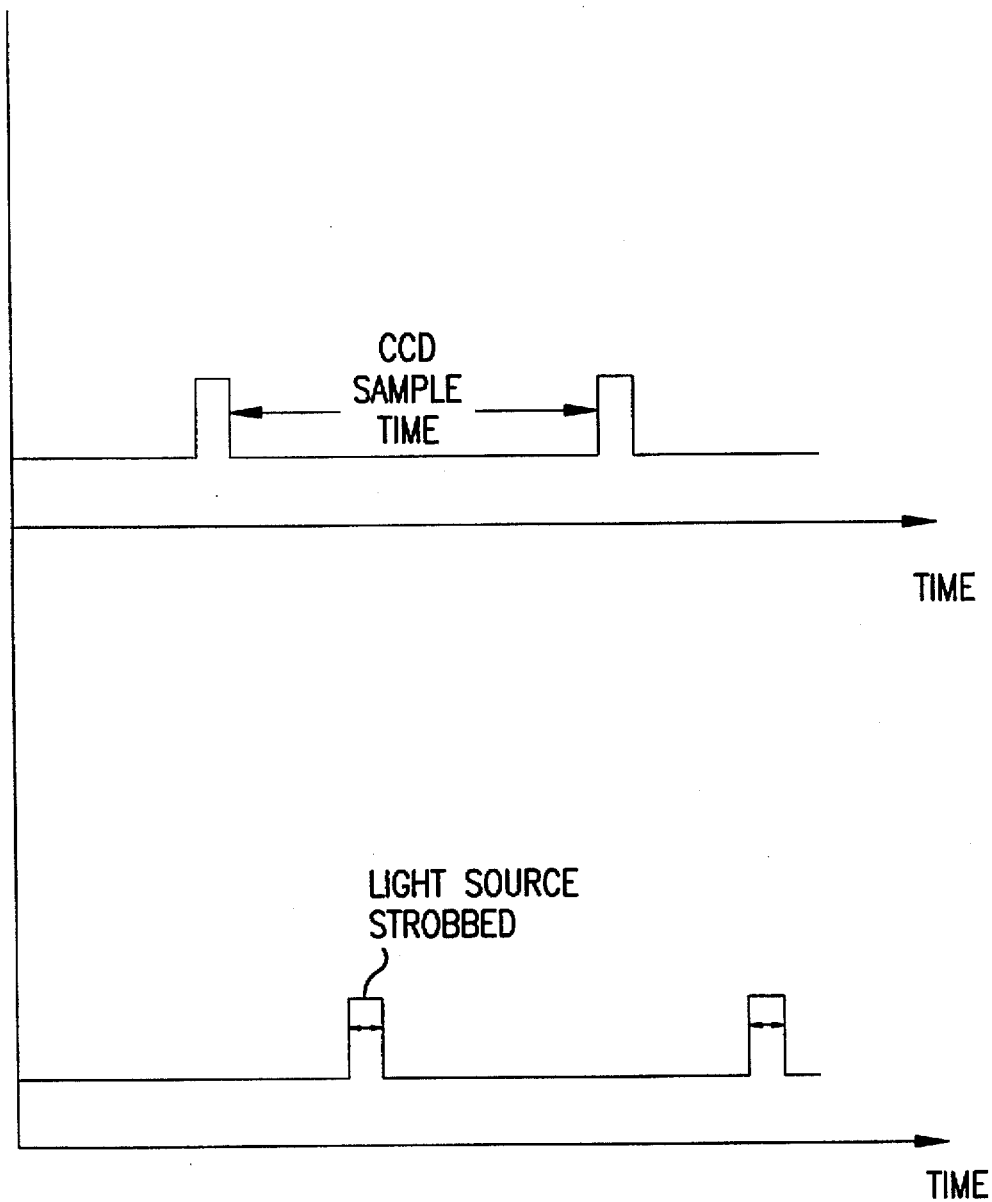
FIG. 2 is a graph illustrating light source operation as a function of time relative to the CCD sampling rate.

FIG. 2 is a graph that illustrates how the light source is synchronized to be strobed during the CCD sampling time. In a best mode, the light source is strobed for 10 percent of the CCD sampling time. This has the effect of stopping the motion of the scanner, similar to an electronic flash when a photograph is being taken has the effect of stopping the motion of objects in the picture. Thus, when the light source is strobed, a sharper image is produced, rather than the usual smeared image due to averaging of several scan lines, which is what the typical scanner does during the scanning process. It should be noted that the use of LEDs is extremely important to get the sharper image, as LEDs turn on and off substantially instantly, unlike the typical scanner light source (fluorescent bulbs), which have an after glow that will contribute to a smeared image. Another advantage of using LEDs is that LEDs are more efficient when pulsed, giving greater than a 30–40% power savings. Also, LEDs can be pulsed with greater light intensity than they could have if left on for the entire scanning cycle. Therefore, the greater intensity for a shorter period (10% of the sampling cycle) can be adjusted to give the same exposure as if the LEDs were left on for the entire scanning cycle. It should also be noted that the LEDs are fired based on the position of the scan line relative to the document, so if it occurs too near in time to the edge of CCD sampling period, the controller will hold off firing the LEDs until the very beginning of the next CCD sampling period. Thus, the shorter the firing time of the LEDs, the closer to the edge of the sample time they can be fired without having to wait for the next sample period, resulting in greater image registration.

Figure 3:
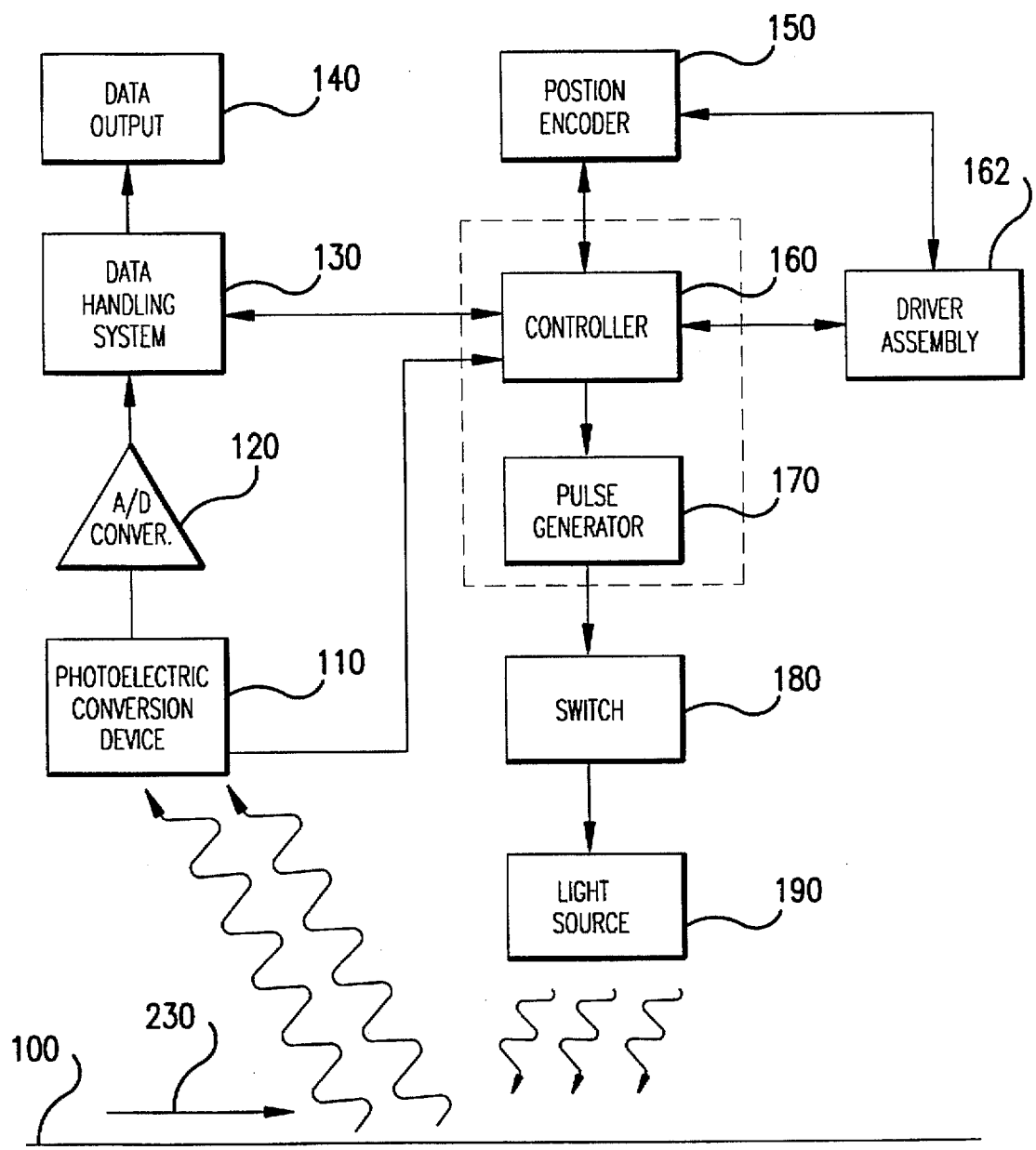
FIG. 3 is a block diagram showing the basic operating components of a scanner according to the present invention.

FIG. 3 shows a basic block diagram of the scanner system of the present invention. Specifically, a driver assembly 162 is operably mounted on the scanner and enables the scanner to be displaced across an object to be scanned (i.e., a document 100) in a predetermined direction 230. A displacement sensing device, such as a position encoder 150, senses the angular displacement of the drive rollers (not shown) and generates a signal representative thereof. A controller 160 actuates the driver assembly 162 for accelerating and decelerating the drive rollers so as to provide tactile feed back to urge an operator to hand displace the scanner across the scanned document 100 within a predetermined speed range which is optimal for scanning. The speed range is preferably selected to be a relatively small speed range just below the maximum scanning speed at which the scanner can operate properly based upon the operating interval of the photoelectric conversion device 110.

The optical assembly comprises a light source 190, which illuminates a current scan line portion of the document 100 which is being scanned. The current scan line is then imaged onto the image plane of the photoelectric conversion device 110 such as a conventional CCD array. The CCD generates a data signal representative of optical images which are impinged thereon during successive operating intervals. Thus, a "picture" of a small portion of a scanned document 100 (a scan line) is taken during each CCD operating interval. The data signal is therefore representative of a series of pictures of scan line portions of a document which are generated as the scanner is moved across the document 100. The signal generated by the CCD 110 is then converted to a digital signal by an analog to digital converter 120 and sent on to a data handling system 130, which either stores the data for later transmittal or transmits the signal to attached devices such as a personal computer (not shown) for further processing (e.g., optical character recognition); or for storage on suitable media such as a hard drive, floppy disk or ROM; or for providing a visual display such as through an attached CRT or printer. The data signal is output through a data output 140.

A typical CCD image sensing device takes a "picture" of the document approximately every millisecond. It will be readily apparent that the speed at which the hand-held scanner is moved across the document 100 is critical because it determines the effective width of each scan line for which data is generated. If the scanner is moved too quickly, erratically or in reverse, information from the document will be lost. If the scanner is moved too slowly, redundant information will be gathered with a resulting loss in scanner performance. Therefore, the driver assembly on the hand-held scanner must urge the operator to maintain an optimal forward speed. To this end, the controller must continually monitor the speed of the scanner and the position of the scanner via information fed back to the controller from the driver assembly and the position encoder.

The controller also generates a pulse via a pulse generator 170 that switches the light source 190 on and off by means of a switch 180, which is preferably a FET switch. The pulse that is generated must take into account the position and velocity of the scanner and the sampling rate of the CCD 110 such that no data on the document 100 is lost and redundant data is not created.

Although the present invention is described for a hand-held optical scanner, it should be readily apparent that it would be straight forward to implement the invention in an automatic document feed scanner or in a flat bed scanner with a moving light source. As long as the position of the moving elements can be tracked and the light source can be strobed, the scanner can be any known type of scanning device, including an OCR or an fax machine. Moreover, because the invention allows for improved registration, which allows the controller to know exactly the position on the document that sampling of the image occurs, if the memory becomes full during the scanning process in an automatic document feed scanner, the controller can stop the scan process, allow the memory to unload, back up the document a predetermined number of scan lines, restart the scan process, and once the document is up to proper scan speed, strobe the light source at the exact position of the next scan line after the one where the scanning process was stopped.

A typical scanner could smear the last scan line prior to the stopping of the scanning process and smear the scan line immediately after restarting the scanning process, not to mention the fact that a typical scanner is not "aware" of the exact position at which scanning was stopped, in order to know where to restart the scanning process. And since the typical scanner must back up the document in order to get the document up to speed before the scanning process can be restarted, there is the possibility of smeared image, lost image, or redundant image.

What is claimed is:

1. An optical scanner comprising:

a) a light source for generating light directed at an object to be scanned;

b) a switch for switching said light source on and off;

c) an optical sensor having a predetermined sampling rate, said optical sensor generating a data signal representative of a scanned object;

d) a driver assembly for enabling displacement of said optical scanner across a scanned object in a predetermined scan direction;

e) a position encoder for sensing the displacement of said optical scanner and generating a displacement signal representative thereof; and f) a controller for actuating said driver assembly during a scanning operation, said controller strobing said switch to said light source on and off synchronized to the sampling rate of said optical sensor and the displacement signal from said position encoder.

2. The optical scanner according to claim 1 wherein said light source comprises a plurality of light emitting diodes.

3. The optical scanner according to claim 2 wherein said optical scanner comprises a hand-held optical scanner.

4. The optical scanner according to claim 2 wherein said optical scanner comprises an automatic document feed scanner.

5. The optical scanner according to claim 2 wherein said optical scanner comprises a flat bed, moving light source scanner.

6. The optical scanner according to claim 1 wherein said light source is strobed on for a predetermined percentage of the sampling time of said optical sensor.

7. The optical scanner according to claim 1 wherein said light source is strobed on for approximately 10% of the sampling time of the optical sensor.

8. The optical scanner according to claim 1 wherein said optical scanner operates off of a small power source.

9. The optical scanner according to claim 1 wherein said optical sensor comprises a CCD array.

* * * * *

UNITED STATES PATENT AND TRADEMARK OFFICE
CERTIFICATE OF CORRECTION

PATENT NO. : 5,744,795
DATED : April 28, 1998
INVENTOR(S) : Mark J. Bianchi, et al It is certified that error appears in the above-identified patent and that said Letters Patent is hereby corrected as shown below:

On the title page, item [56] add the following:

U. S. PATENT DOCUMENTS

| EXAMINER INITIAL | PATENT NUMBER | ISSUE DATE | PATENTEE | CLASS | SUBCLASS | FILING DATE IF APPROPRIATE |
|---|---|---|---|---|---|---|
|  | 5 2 0 2 5 5 6 | Apr. 13, 1993 | Kawabata; Takashi, et al. |  |  |  |
|  |  |  |  |  |  |  |

FOREIGN PATENT OR PUBLISHED FOREIGN PATENT APPLICATION

| | DOCUMENT NUMBER | PUBLICATION DATE | COUNTRY OR PATENT OFFICE | CLASS | SUBCLASS | TRANSLATION YES | NO |
|---|---|---|---|---|---|---|---|
|  | DE 4 10 6 7 5 3 | 2.3.91 | Kawabata; Takashi, et al. |  |  |  |  |
|  |  |  |  |  |  |  |  |

Signed and Sealed this

Ninth Day of February, 1999

Attest:

Attesting Officer

Acting Commissioner of Patents and Trademarks